United States Patent Office 2,951,094
Patented Aug. 30, 1960

2,951,094

TRIETHERS OF GLYCEROL

Robert E. Hefner and Malcolm E. Pruitt, Lake Jackson, Tex., assignors to The Dow Chemical Company, Midland, Mich., a corporation of Delaware No Drawing. Filed May 28, 1954, Ser. No. 433,255

1 Claim. (Cl. 260—615)

This invention relates to new trialkyl triethers of (monohydroxy mixed polyoxyalkylene) monoethers of glycerol and a method for their preparation.

The new compounds of the invention are trialkyl triethers of (monohydroxy mixed polyoxyalkylene) monoethers of glycerol in which the polyoxyalkylene chain is composed of at least 5 oxyalkylene units formed randomly from at least two different alkylene oxides. These compounds correspond to the general formulae:

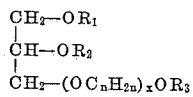

and

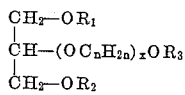

wherein $R_1$, $R_2$, and $R_3$ are alkyl groups and may be the same or different; $n$ has an average value between 2.5 and 3.8 inclusive; and $x$ has a value of at least 5. In general, these new glyceryl triether compounds have polyoxyalkylene chains which are composed of from 5 to about 50 oxyalkylene units and are formed from two or more alkylene oxides each containing less than 5 carbon atoms per molecule, such as ethylene oxide, 1,2-propylene oxide, 1,2-butylene oxide, or 2,3-butylene oxide. Of the oxyalkylene units in the polyoxyalkylene chain, those corresponding to any single alkylene oxide may not constitute more than 90 mole percent of the polyoxyalkylene portion of the molecule, nor may oxyethylene units comprise more than 50 mole percent thereof. These mixed polyoxyalkylene chains may be composed of mixed oxyethylene-oxy-1,2-propylene units, mixed oxyethylene-oxy-1,2-butylene units, mixed oxy-1,2-propylene-oxy-2,3-butylene units, mixed oxyethylene-oxy-1,2-propylene-oxy-1,2-butylene units, etc. Since these polyoxyalkylene ether chains can and do vary slightly in length from molecule to molecule in any given reaction product, the novel compounds herein described can best be defined in terms of their average molecular weights or according to the average number of oxyalkylene units in the polyoxyalkylene ether chain, e.g. from 5 to 50 oxyalkylene units.

Typical of the new trialkyl triethers of (monohydroxy mixed polyoxyalkylene) monoethers of glycerol are those which correspond to the following general formula:

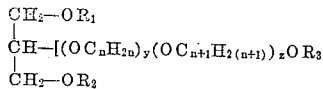

wherein $R_1$, $R_2$ and $R_3$ are alkyl groups having from 1 to 8 carbon atoms each, said alkyl groups being either primary or secondary groups which may be the same or different; $n$ is an integer from 2 to 3; and $y+z$ represents the average number of all oxyalkylene units in the molecule, said average number having a value from 5 to 50 of which $y$ constitutes from 10 to 50 mole percent of the total when $n$ is 2, and from 10 to 90 mole percent of the total when $n$ is 3.

The new compounds are prepared most conveniently by the reaction of a mixture of alkylene oxides with a dialkyl diether of glycerol to produce dialkyl hydroxy polyoxyalkylene glyceryl ether intermediates, which are then further etherified to form the products of the invention.

The dialkyl diethers of glycerol which may be employed as starting materials in the process of the invention may be prepared in several different ways using 1,3-dichloro-2-propanol or epichlorohydrin as initial reactants. For example, one molecular proportion of 1,3-dichloro-2-propanol may be reacted with 2 molecular proportions of a sodium alcoholate to form the corresponding dialkyl diether of glycerol, i.e. 1,3-dialkoxy-2-propanol. The equation for the reaction of 1,3-dichloro-2-propanol with a simple alcoholate, viz. sodium methylate, may be written as follows:

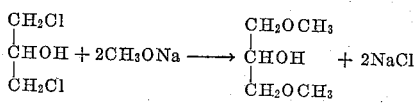

Alternatively, one molecular proportion of epichlorohydrin may be reacted with one molecular proportion each of a monohydroxy aliphatic alcohol and the sodium alcoholate of the same or a different alcohol. When epichlorohydrin is reacted with sodium methylate and methanol, the following equation represents the preponderant reaction:

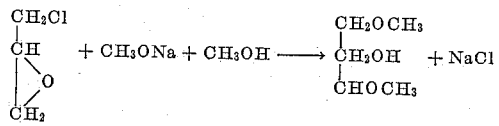

This latter method has usually been employed to prepare the starting materials for the instant process and is carried out by gradually adding one molecular proportion of epichlorohydrin to one molecular proportion of sodium alcoholate dissolved in an excess of the reactant alcohol. Reaction will generally take place at a temperature in the range of about 25° to about 125° C. when methanol and sodium methylate are employed, although the more restricted range of about 60° to about 100° C. is preferred for best results. A somewhat higher range of temperatures is ordinarily required when higher molecular weight alcohols and sodium alcoholates are substituted for methanol and sodium methylate in the epichlorohydrin reaction. Although some 1,2-dialkyl diethers of glycerol are inevitably formed in such a reaction, substantially all of the ether groups of the glycerol reaction product are believed to be positioned on the two terminal carbon atoms of the glycerol nuclei, i.e. 1,3-dialkyl diethers of glycerol.

Employing dialkyl diethers of glycerol as starting materials, the new compounds of the present invention are prepared by the following novel process which involves the steps of:

(1) Reacting sodium with a dialkyl diether of glycerol to form the sodium salt thereof.

(2) Condensing the sodium derivative of the previous step with mixed alkylene oxides to form the sodium salts of (monohydroxy mixed polyoxyalkylene) monoethers of the dialkyl diether of glycerol.

(3) Etherifying the sodium salt from the above step with an alkyl halide to form the desired products of the invention, viz. trialkyl triethers of (monohydroxy mixed polyoxyalkylene) monoethers of glycerol.

In the first step (1) of making the products of the invention, sodium is reacted with a dialkyl diether of glycerol to form the sodium salt of the ether alcohol as shown in the following typical equation:

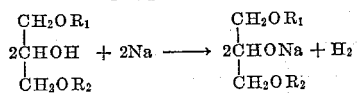

wherein $R_1$ and $R_2$ are alkyl groups and may be the same or different.

During the second step (2), the sodium salt of the dialkyl diether of glycerol is reacted with a mixture of at least two different essentially anhydrous alkylene oxides, no one oxide comprising more than 90 mole percent, and ethylene oxide comprising no more than 50 mole percent, of the total oxide mixture. For this purpose ethylene oxide, 1,2-propylene oxide, 1,2-butylene oxide, and 2,3-butylene oxide are satisfactory. Depending upon the point of attachment of the alkyl groups, hydroxy mixed polyoxyalkylene ether chains may be attached to either the middle or the terminal carbon atom of the glycerol nucleus. For example, when a mixture of alkylene oxides is reacted with a 1,3-dialkyl diether of glycerol, the resultant mixed hydroxy polyoxyalkylene ether chains are attached to the middle carbon atom of the glyceryl nucleus. When a 1,2-dialkyl diether of glycerol is similarly reacted, the mixed hydroxy polyoxyalkylene ether chain becomes attached to a terminal glyceryl carbon atom. If, however, a mixture of 1,2- and 1,3-dialkyl diethers of glycerol are employed, a mixture of ethers of glycerol result in which the hydroxy polyoxyalkylene ether chains are attached to the 1-position of some glycerol nuclei and the 2-position of others.

The third step (3) involves the further etherification of the intermediates resulting from the oxyalkylation step, viz. the sodium salts of the (monohydroxy mixed polyoxyalkylene) monoethers of the above-described dialkyl diethers of glycerol, by reacting them with an alkyl halide to form the products of the invention.

With these steps in mind, the process of the invention is hereinafter described in considerably greater detail. All steps are carried out under relatively moisture-free conditions and may be conducted batchwise or continuously as desired. A relatively inert diluent is ordinarily employed as a common solvent both for the reactants as well as the oxyalkylated products of the invention. Under the conditions of the reaction, the diluent should be relatively inert to metallic sodium, the alkylene oxides, the dialkyl diether of glycerol, and also to the alkyl halide. Classified hereinafter as relatively inert diluents are those diluents which are essentially non-reactive toward all of the organic reactants but which may form metallic-organic compounds with an excess of sodium remaining after essentially all of the dialkyl diether of glycerol has been reacted, e.g. with sodium. Typical diluents which are relatively inert in the process of the invention are such compounds as diisopropyl ether, dioxane, n-hexane, cyclohexane, benzene, and toluene. The preference of diluent for any given reaction depends somewhat on the identity of the reactants, although almost any relatively inert diluent which is a mutual solvent for the reactants is satisfactory. The amount of diluent should in general be sufficient to dissolve and maintain most of the reactants, as well as the organic portion of the resultant product, in solution throughout the course of the reaction.

STEP 1

In a batchwise process for preparing the intermediate sodium salt of the organic hydroxy compound, i.e. the dialkyl diether of glycerol, the total charge of the glycerol compound starting material, sodium, and diluent may all be charged into a suitable reaction vessel and reacted without any subsequent addition of reagents. Preferably, however, only the diluent and sodium are initially charged into the reaction vessel, the dialkyl diether of glycerol being added gradually. It may sometimes be more desirable to make the sodium salt of such an organic hydroxy compound in a continuous manner by gradually adding all three constituents simultaneously to the reaction vessel and continuously withdrawing the reaction product containing the sodium derivative of the organic hydroxy compound, i.e. the sodium salt of the dialkyl diether of glycerol. Ordinarily, a sufficient amount of sodium is employed to react with most of the dialkyl diether of glycerol, and desirably with substantially all of this compound. Based on the total moles of the dialkyl diether of glycerol employed in the reaction, greater than 0.8 of a molecular proportion, and preferably greater than 0.9 of a molecular proportion of sodium is used for every molecular proportion of the organic hydroxy compound. For best results, approximately equimolecular proportions of sodium and the organic hydroxy compound are usually employed. A large excess of sodium apparently has no worthwhile purpose and no improvements have been observed in the properties of the mixed polyoxyalkylene monoethers subsequently prepared. To the contrary, when the reaction is carried out with excess sodium in the presence of an aromatic hydrocarbon diluent, e.g. benzene or toluene, an aromatic impurity is formed which persists in the reaction product as a non-water soluble, non-filterable, difficulty-removable, white flocculent solid. However, no such solid contaminant has ever been seen to form when carrying out the reaction in the presence of non-aromatic diluents, e.g. diisopropyl ether, n-hexane, and cyclohexane. When using less than an equivalent weight of sodium per equivalent weight of the dialkyl diether of glycerol, the spread between the individual molecular weights of the polyoxyalkylene ether products of the invention becomes progressively more pronounced with less and less sodium, i.e. there appear increasingly great differences in the lengths of the polyoxyalkylene chains from molecule to molecule in the product mixture. The reaction of sodium and a dialkyl diether of glycerol is generally accomplished under conditions of good agitation, at a temperature which provides a satisfactory rate of reaction, and for a time sufficiently long to produce the desired degree of reaction. These conditions all depend somewhat on the identity and reactivity of the glycerol dialkyl diether, e.g. the dimethyl ether of glycerol is more reactive than the di-n-butyl ether and the latter more reactive than the di-sec-butyl ether, etc. Although a reaction temperature as low as −10° C. may sometimes be employed, the sodium salt of the dialkyl diether of glycerol is generally formed by heating the reactants, sometimes to a reaction temperature as high as 150° C. Ordinarily the reaction is carried out at a temperature in the range of about 100° to 120° C. Since hydrogen is given off by the glycerol diether compound when sodium replaces the hydroxy hydrogen thereof, hydrogen gas is necessarily vented from the reaction vessel during the course of the reaction.

STEP 2

Upon obtaining the intermediate sodium salt of the dialkyl diether of glycerol, e.g. the sodium dialkoxy glycerolate, it is next reacted with a mixture of alkylene oxides to form the sodium salt of the (monohydroxy mixed polyoxyalkylene) monoether of the dialkyl diether of glycerol. Usually a solution of the sodium salt of the dialkyl diether of glycerol in an inert diluent is employed, e.g. the total reaction product from the preceding step. In carrying out this reaction in a batchwise manner with a mixture of alkylene oxides as hereinbefore defined, the solution of the sodium derivative of the glycerol dialkyl diether in an inert diluent is initially charged into a suitable reaction vessel and heated to the desired reaction temperature in the range of 60° to 200° C. In most instances, a temperature above 80° C. is required to secure acceptable reaction rates, particularly in making products of high molecular weight. On the other hand, above 165° C. there is a tendency for objectionable discoloration of the product. For optimum results, a temperature between 110° and 140° C. is usually employed. To this heated solution of the sodium salt of the dialkyl diether of glycerol is gradually added the relatively moisture-free mixture of alkylene oxides under conditions of good mixing. Since the condensation, once under way, is highly exothermic, cooling can be applied with advantage. The mixed alkylene oxides are added to the reaction vessel until a sufficient amount has reacted with the sodium salt of the dialkyl diether of glycerol to give a mixed polyoxyalkylene ether chain having an average of at least 5 oxyalkylene groups. This requires that at least five molecular proportions of mixed alkylene oxides as hereinbefore defined be introduced for each molecular proportion of the sodium derivative of the dialkyl diether of glycerol. For good product uniformity, it is important that the mixed alkylene oxides so employed should be relatively pure and moisture-free. Their moisture content should be less than 0.1 percent and preferably less than 0.05 percent by weight. For best results, a moisture content of less than 0.02 percent by weight is desirable. Likewise, the mixed alkylene oxides, should be free, or relatively free, from contaminants such as aldehydes which give rise to side reactions and by-product formation. In general, the operating pressure produced by the addition of alkylene oxides is held in the range of 10 to 50 pounds per square inch gauge, with pressures over 100 pounds being carefully avoided to prevent the reaction from getting out of control. This reaction with mixed alkylene oxides may also be carried out in a continuous manner by gradually adding the reactants (and inert solvent) to a reaction tube or vessel and continuously withdrawing the reaction product therefrom.

When the (monohydroxy mixed polyoxyalkylene) monoether of the glycerol dialkyl diether is desired as the end-product, the total reaction product from the preceding step is neutralized, e.g. with anhydrous or aqueous HCl. In working up the resultant (monohydroxy mixed polyoxyalkylene monoether) of the glycerol dialkyl diether, the organic product is separated from the salt or brine and heated under vacuum to distill off the diluent and any low boiling material. Prior to the distillation step, the organic portion may, if desired, be washed with a suitable solvent to extract any impurities therefrom.

STEP 3

When a trialkyl triether of a (monohydroxy mixed polyoxyalkylene) monoether of glycerol is desired as the final product, the reaction product containing the sodium salt of the (monohydroxy mixed polyoxyalkylene) monoether of the glycerol dialkyl diether is reacted with an alkyl halide, e.g. an alkyl chloride. The reaction is desirably carried out until substantially all of the sodium atoms attached to the mixed polyoxyalkylene chain have been reacted. The amount of alkyl halide used to form the trialkyl triethers of (monohydroxy mixed polyoxyalkylene) monoethers of glycerol is generally slightly in excess of one equivalent weight per equivalent weight of the sodium salt of the (monohydroxy mixed polyoxyalkylene) monoether of the glycerol dialkyl diether. That is to say, greater than one molecular proportion of alkyl halide is employed per molecular proportion of the sodium salt of the (monohydroxy mixed polyoxyalkylene) monoether of the glycerol dialkyl diether. This reaction is likewise carried out in the presence of an inert diluent as hereinbefore described. Usually the total reaction product from the condensation step with the mixed alkylene oxides is used per se, e.g. the solution of the sodium salt of the (monohydroxy mixed polyoxyalkylene) monoether of the glycerol dialkyl diether. It is frequently desirable to add more sodium to the total reaction product after reaction with the mixed alkylene oxides but prior to the final etherification with alkyl halide. This subsequent addition of sodium insures ether formation by reacting with sodium any hydroxy groups which might be present, e.g. as a result of reacting less than one molecular proportion of sodium with one molecular proportion of the initial glycerol dialkyl diether compound to form the sodium salt thereof. The final etherification reaction with an alkyl halide may be carried out batchwise by charging all the reactants into a suitable reaction vessel. The reactants are then heated to a reaction temperature in the range of 60° to 160° C. for a time sufficiently long to attain the required degree of reaction. More frequently, the reaction temperature is maintained in the range of from about 100° C. to 120° C., especially when a lower alkyl halide is employed, e.g. one containing no more than 4 carbon atoms in the molecule. For best conversions and yields, the alkyl halide is methyl or ethyl chloride. Upon completion of the reaction, the total reaction product is generally filtered to remove any insoluble matter, e.g. NaCl, and then subjected to distillation to remove any low boiling material, e.g. inert diluent or low boiling ethers.

The new products of the invention are mixtures of trialkyl triethers of (monohydroxy mixed polyoxyalkylene) monoethers of glycerol, the polyoxyalkylene ether chains of which are characterized by a high degree of uniformity in length from molecule to molecule throughout the mixture. As a consequence, there is very little molecular weight spread between the individual molecules which constitute any given product mixture. These new compositions have exceedingly low pour points (usually below −50° F.), high flash points (generally above 370° F.), and high viscosity indices (ordinarily above 140). Their viscosities vary from about 2.5 to 15 centistokes and higher at 210° F. depending upon the average number of oxyalkylene units in the mixed polyoxyalkylene chains.

A large proportion of oxyethylene units to oxypropylene or oxybutylene units in such polyoxyalkylene chains will ordinarily impart a high degree of thermal stability to the compounds of the invention. Water miscibility will at the same time be increased at the expense of oil miscibility. On the other hand, a large porportion of oxypropylene or oxybutylene units will increase the oil miscibility and decrease the water miscibility of the new compounds, oxybutylene units even more than oxypropylene units. Thermal stability, however, decreases with increasing number of oxybutylene units in the polyoxyalkylene chains. Due to the presence of three alkyl groups in the instant compounds, a high degree of miscibility with petroleum oils may be obtained.

In addition to oil miscibility, the novel compounds of the invention exert a solvating action on many carbonaceous deposits, sludges, and tars. Furthermore, these new products can be spread into thin films which have good strength under heavy loads and high shear. These and other properties make the new glycerol triether compounds of the invention useful additives to petroleum oil lubricants and in lubricating applications in general, especially where low temperatures are involved. Due to their good thermal stability and low rate of change in viscosity with increasing temperature, they have been successfully employed as high temperature lubricants, e.g. as internal combustion engine oils, particularly as crankcase lubricants in 4-cycle engines. In such use, these novel compounds improve low-temperature engine starting and show little tendency to break down and deposit out in combustion chambers, to pick up metals, or to form acids or sludges. These and other factors such as small consumption of the lubricant, low viscosity change with use, and little change in viscosity index, lead to long life of the lubricant, as well as low wear, corrosion, and contamination of the engine. The new compounds of the invention also decrease crankcase dilution by preventing gasoline, water, lead, etc. from dropping into the crankcase from the combustion chamber. As additives to motor fuel, especially to fuel which is to be fed to 2-cycle engines, the compositions of the invention increase engine efficiency and are excellent lubricants and solvating agents for carbon deposits, gums, and sludges.

When employing the glycerol trialkyl triether compounds of the invention as crankcase lubricants in 4-cycle internal combustion engines, it is generally desirable to dissolve in them an antioxidant to inhibit viscosity changes and acid production. Phenothiazine has been found to be a particularly effective antioxidant for the instant compounds when used in concentrations of from about 0.1 to 1 percent by weight. Higher concentrations of phenothiazine in the glycerol trialkyl triether compounds on up to about 10 percent by weight may sometimes be used to advantage.

The following examples describe the preparation and properties of some of the new trialkyl triethers of (monohydroxy mixed polyoxyalkylene) monoethers of glycerol in accord with the invention.

*Example 1*

A 100 gallon, steam-jacketed, steel reaction vessel was purged with dry nitrogen and charged with 25 United States gallons of toluene and 4.41 pounds (0.192 pound mole) of sodium metal. The contents of the vessel was then mixed with a mechanical stirrer and heated to about 110° C. Thereupon the pressure was bled down to 30 pounds per square inch gauge and exactly 23 pounds (0.192 pound mole) of glycerol-1,3-dimethyl ether was slowly added to the thoroughly-mixed contents of the vessel while maintaining the pressure in the range of 30 to 50 pounds per square inch gauge. After adding all of the glycerol-1,3-dimethyl ether, the reaction mixture was digested for approximately two hours until essentially all of the glycerol-1,3-dimethyl ether had been reacted to form the sodium derivative thereof as evidenced by cessation in the evolution of hydrogen gas. The temperature of the well-agitated contents of the reaction vessel was then raised to 125° C. and 469.5 pounds of an alkylene oxide mixture consisting of 55.5 pounds (1.26 pound moles) of ethylene oxide and 414 pounds (7.13 pound moles) of 1,2-propylene oxide was added at such a rate that the pressure was regulated between 30 and 50 pounds per square inch gauge to maintain the temperature at approximately 125° C. This alkylene oxide addition represents a reactant ratio of 6.56 pound moles of ethylene oxide and 37.14 pound moles of propylene oxide per pound mole of glycerol-1,3-dimethyl ether.

After the addition of all the mixed alkylene oxides, the reaction mixture was digested for about 30 minutes. Methyl chloride was then passed into the reaction vessel in excess of the amount of sodium initially charged in order to cap, i.e. etherify, all of the polyoxyalkylene chains. After again digesting the reaction mixture to insure completeness of the reaction, the total product was filtered while hot to remove sodium chloride and heated under vacuum to distill off toluene and low boiling fractions. The purified triether of glycerol was found to have the following physical properties:

Average molecular weight (by hydroxyl analysis
  of uncapped material) _____ 1090
Flash point (C.O.C.) _____°F._ 420
Viscosity at 100° F. _____centistokes__ 54.4
Viscosity at 210° F. _____do_____ 9.84
Viscosity Index [1] _____ 145

[1] A.S.T.M. Standard Method D567–41.

The viscosity index is an empirical number indicating the effect of change of temperature on the viscosity as calculated from viscosity at 100° and 210° F. A high viscosity index, e.g. 145, signifies relatively small change of viscosity with temperature.

The above-characterized glycerol triether when stabilized with 0.6 percent by weight of phenothiazine was tested and found to be an excellent crankcase lubricant for automotive use as well as an exceptionally good 2-cycle engine lubricant (by adition to the engine fuel).

*Example 2*

Using the same equipment, reaction conditions, and procedure employed in Example 1, exactly 20 pounds (0.166 pound mole) of glycerol-1,3-dimethyl ether was reacted with 3.81 pounds (0.166 pound mole) of sodium dissolved in 25 United States gallons of toluene. The entire product mixture containing the sodium derivative of glycerol-1,3-dimethyl ether was then reacted with 307 pounds of an oxide mixture consisting of 62 pounds (1.41 pound moles) of ethylene oxide and 245 pounds (4.22 pound moles) of 1,2-propylene oxide. This represents a reactant ratio of approximately 8.49 pound moles of ethylene oxide and 25.42 pound moles of 1,2-propylene oxide per pound mole of glycerol-1,3-dimethyl ether. Methyl chloride was then added as the capping agent to etherify the polyoxyalkylene chains. The purified glycerol triether reaction product was found to have the following physical properties:

Average molecular weight (by hydroxy analysis of
  uncapped material) _____ 818
Flash point (C.O.C.) _____°F._ 421
Viscosity at 100° F. _____centistokes__ 32.7
Viscosity at 210° F. _____do____ 7.72
Viscosity index _____ 166

*Example 3*

Employing the same equipment, reaction conditions, and procedure used in Example 1, exactly 18 pounds (0.12 pound mole) of 1,3-diethoxy glycerol was reacted with 2.75 pounds (0.12 pound mole) of sodium dissolved in 20 United States gallons of toluene. Upon completion of the reaction, 280 pounds of an oxide mixture consisting of 120.8 pounds (2.74 pound moles) of ethylene oxide and 159.2 pounds (2.74 pound moles) of 1,2-propylene oxide was added to the reaction vessel. This represents a reactant ratio of approximately 22.8 pound moles of ethylene oxide and 22.8 pound moles of 1,2-propylene oxide per pound mole of glycerol-1,3-diethyl ether. Following the completion of this reaction, ethyl chloride was added as the capping agent. The purified glycerol triether reaction product was found to have the following physical properties:

Average molecular weight (by hydroxyl analysis
  of uncapped material) _____ 1504
Flash point (C.O.C.) _____°F._ 432
Viscosity at 100° F. _____centistokes___ 67.76
Viscosity at 210° F. _____do____ 13.4
Viscosity index _____ 152

*Example 4*

Following the same procedure and employing the same reaction conditions as in Example 1 but using only a 10 gallon steel kettle, 1000 grams (4.9 gram moles) of glycerol-1,3-dibutyl ether was reacted with 110 grams (4.8 gram moles) of sodium dissolved in two United States gallons of toluene. The total reaction product containing the sodium derivative of glycerol-1,3-dibutyl ether was then reacted with 12,000 grams of a mixture of 763 grams (17.32 gram moles) of ethylene oxide and 11,237 grams (155.85 gram moles) of a mixture of 1,2- and 2,3-butylene oxides. This represents a reactant ratio of approximately 3.53 gram moles of ethylene oxide and 31.81 gram moles of butylene oxides per gram mole of glycerol-1,3-dibutyl ether. Methyl chloride was added as the capping agent to etherify the polyoxyalkylene chains. The purified glycerol triether reaction product was found to have the following physical properties:

Average molecular weight (by hydroxyl analysis
  of uncapped material) _____ 1085
Flash point (C.O.C.) _____°F._ 418
Viscosity at 100° F. _____centistokes__ 91.7
Viscosity at 210° F. _____do____ 14.1
Viscosity index _____ 138

Example 5

Again using the same procedure and employing the same reaction conditions as in Example 1 but using a 10 gallon steel kettle, 588 grams (4.9 gram moles) of glycerol-1,3-dimethyl ether was reacted with 110 grams (4.8 gram moles) of sodium dissolved in two United States gallons of toluene. This product was then reacted with an oxide mixture consisting of 826 grams (18.75 gram moles) of ethylene oxide and 1089 grams (18.75 gram moles) of 1,2-propylene oxide. This represents a reactant ratio of approximately 3.83 gram moles of ethylene oxide and 3.83 gram moles of 1,2-propylene oxide per gram mole of glycerol-1,3-dimethyl ether. Methyl chloride was used as the capping agent to etherify the reaction product. The purified glycerol triether was found to have the following physical properties:

Average molecular weight (by hydroxyl analysis of uncapped material) _____ 510
Flash point (C.O.C.) _____ °F__ 381
Viscosity at 100° F _____ centistokes____ 9.32
Viscosity at 210° F _____ do____ 2.88
Viscosity index _____ 175

Example 6

That the glycerol trialkyl triether products of the invention have oxidation resistance which compares favorably with marketed petroleum oils is indicated by the results of the accelerated oxidation tests hereinafter described. These tests were carried out in a glass cell containing a 200 gram sample of the liquid to be tested and, in addition a uniformly polished and weighed copper strip. The glass cell with its contents was then placed in a constant temperature bath heated to 135° C. and air, saturated with water vapor, was bubbled through the test-liquid at a rate of 100 milliliters per minute. At the end of 120 hours, the liquid was analyzed for increase in viscosity, increase in acidity, copper content, and amount of sludge.

Two tests were carried out on samples of a glycerol trialkyl triether product of the invention prepared according to the procedure of Example 2, one sample (A) of the liquid product being stabilized with 0.6 percent by weight of phenothiazine and the other sample (B) with 1 percent of alpha-naphthylamine.

For purpose of comparison, two liquids (C) and (D) not in accord with the invention were also subjected to the above described accelerated oxidation test. The liquids tested were premium grade motor oils both of which were especially recommended and sold by the manufacturer as crankcase lubricants for 4-cycle engines. Oil C was a synthetic oil of the polyoxyalkylene glycolether type stabilized with approximately 4 percent by weight of alpha-naphthylamine. Oil D was a highly refined paraffin-base oil containing about 15 percent by weight of additives of which approximately one half were polyacrylic esters. The results of all four tests are tabulated below.

TABLE

| Liquid Tested | Air Flow to Liquid, cc./min. | Temperature of Liquid, °C. | Duration of Test, hours | Acidity Increase, p.p.m. | Viscosity Increase, percent | Copper Content, p.p.m. | Sludge Content, wt. percent |
|---|---|---|---|---|---|---|---|
| A | 100 | 135 | 120 | 5 | 0.9 | 3.0 | .08 |
| B | 100 | 135 | 120 | 35 | 1.2 | 7.5 | .10 |
| C | 100 | 135 | 120 | 185 | 4.2 | 56.0 | .28 |
| D | 100 | 135 | 120 | 4,750 | 5.8 | 260.0 | 1.10 |

That which is claimed:

A process for producing trialkyl triethers of (monohydroxy mixed polyoxyalkylene) monoethers of glycerol comprising contacting a dialkyl diether of glycerol, wherein the alkyl groups contain 1 to 8 carbon atoms, with metallic sodium in a relatively inert diluent until at least about 80 percent of the diether of glycerol has been converted to the sodium salt thereof; condensing said dialkyl diether of glycerol with 5 to 50 moles of a mixture of at least two vicinal alkylene oxides, the alkylene groups of which contain 2 to 4 carbon atoms, said mixture containing not more than 90 mole percent of any one oxide nor more than 50 mole percent of ethylene oxide, said condensation being effected under substantially anhydrous conditions, in a relatively inert diluent, and at a temperature of about 60° to 200° C.; and finally condensing the sodium salt of the (monohydroxy mixed polyoxyalkylene) monoether of the dialkyl diether of glycerol thus produced with a lower alkyl halide at a temperature of about 60° to 160° C. until substantially all the sodium salt has been converted to alkyl ether.

References Cited in the file of this patent

UNITED STATES PATENTS

| | | |
|---|---|---|
| 2,481,278 | Ballard et al. | Sept. 6, 1949 |
| 2,520,611 | Roberts et al. | Aug. 29, 1950 |
| 2,679,521 | De Groote | May 25, 1954 |
| 2,782,240 | Hefner et al. | Feb. 19, 1957 |

OTHER REFERENCES

Cretcher et al.: Jour. Amer. Chem. Soc., vol. 46 (1924), pages 1503–4 (2 pp.).